Sept. 18, 1945.   N. V. KUEHLMAN   2,385,141
BOLT TRACK AND ASSORTER
Original Filed July 10, 1941   3 Sheets-Sheet 1

INVENTOR.
Norman V. Kuehlman
BY
Gifford, Scull & Burgess
ATTORNEYS

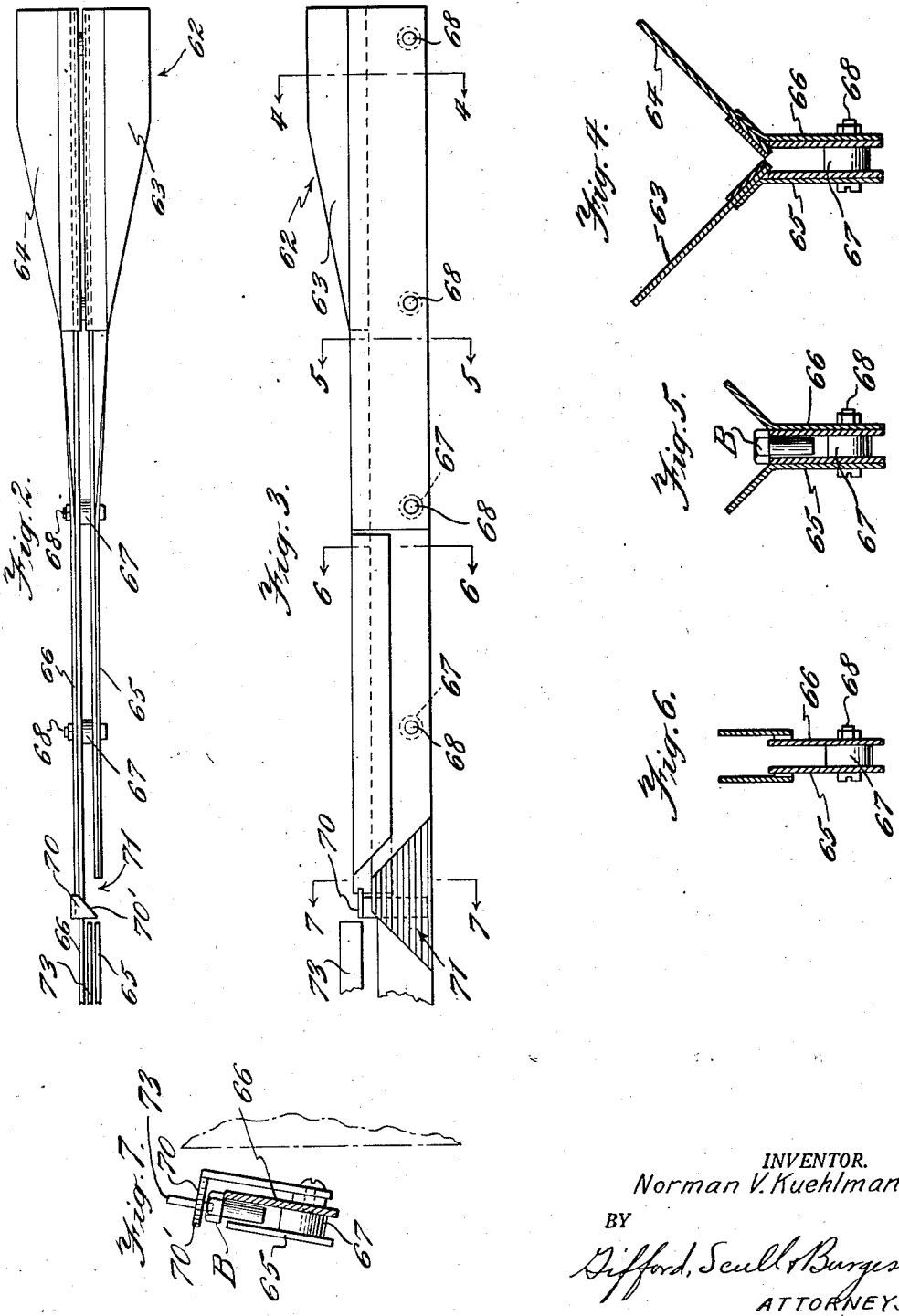

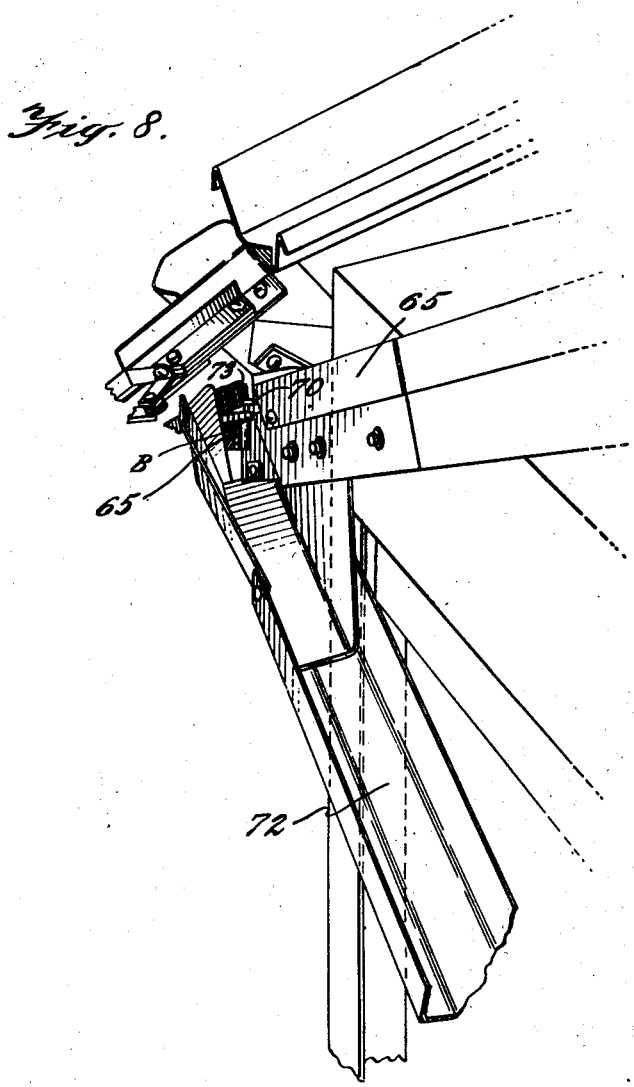

Patented Sept. 18, 1945

2,385,141

UNITED STATES PATENT OFFICE 2,385,141

BOLT TRACK AND ASSORTER

Norman V. Kuehlman, Milwaukee, Wis., assignor to The National Lock Washer Company, Newark, N. J., a corporation of New Jersey Original application July 10, 1941, Serial No. 401,804. Divided and this application August 25, 1942, Serial No. 456,041

2 Claims. (Cl. 209—90)

This is a division of my application Ser. No. 401,804.

The invention described and claimed herein is for a bolt blank track and assorter adapted to convey bolts or bolt blanks from one point to another and, at the same time, position the blanks in a predetermined manner and reject those which are improperly positioned or proportioned.

Fig. 2 is a plan view of a portion of the bolt track.

Fig. 3 is a side elevation of the track shown in Fig. 2.

Fig. 4 is a section through 4—4 of Fig. 3.

Fig. 5 is a section through 5—5 of Fig. 3.

Fig. 6 is a section through 6—6 of Fig. 3.

Fig. 7 is a section through 7—7 of Fig. 3.

Fig. 8 is a perspective view of the rejection mechanism in the blank track.

Figure 1:
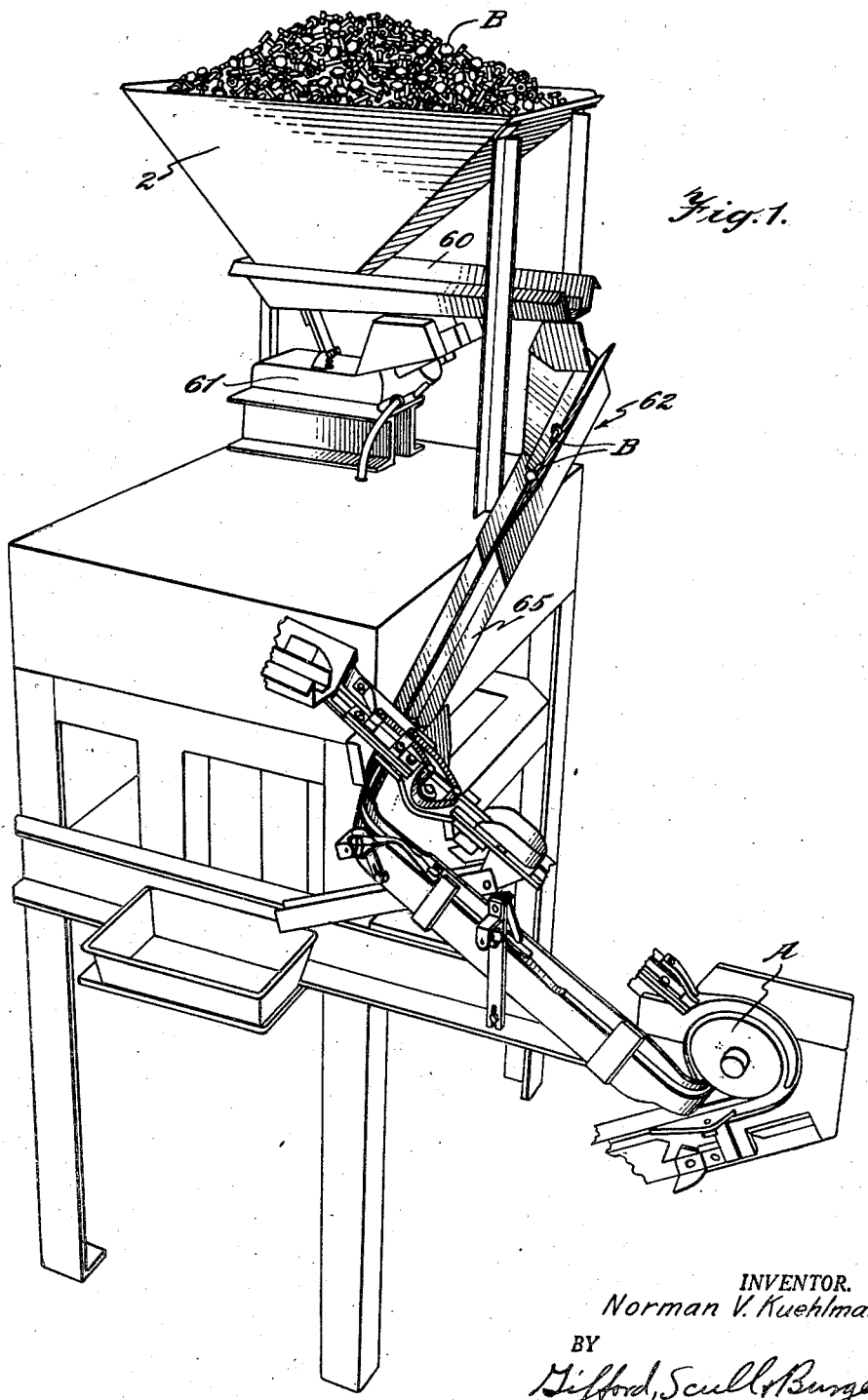
Fig. 1 is a perspective view of the device as embodied in a bolt and washer assembly machine with most of those parts which do not pertain to the present invention omitted from the figure.

A hopper 2 is provided to receive a quantity of bolt blanks B. This hopper is shown in the form of an inverted pyramid but may be conical, if so desired. From it, the blanks are conveyed along a suitable path which will be described in detail, to their destination which may be an assembly mechanism or similar device.

Near the bottom of the bolt blank hopper 2 are suitable baffles, not shown, to prevent the full weight of the blanks from being imposed upon the apparatus underneath the opening in the lowermost part of the hopper. Under this opening is positioned a blank vibrating feeder 60 mounted upon a vibrator 61. A suitable form of feeder mechanism is sold under the trade name of "Syntron" and made under United States Letters Patent Nos. 1,637,401 and 1,637,717.

The feeder 60 is positioned close enough to the bottom of the hopper 2 to prevent uncontrolled discharge of the blanks. Blank flow control is obtained by adjusting the position of the vibrator 61.

Feeder 60, as shown in Fig. 1, is open at the right end which is positioned above the blank aligning trough 62. The upper end of trough 62 has wide V-shaped sides 63 and 64 which taper down and separate at the bottom thereof to form a track made up of two parallel vertically disposed rails or surfaces 65 and 66.

Members 65 and 66 are spaced apart a distance slightly greater than the diameter of the shank of the bolt blank B by means of suitable spacing members 67 held in place by bolts 68. When the blank drops from feeder 60 into the trough 62, the V-shaped cross section thereof, as shown in Fig. 4, serves to align up the blanks and, as they pass downwardly and move from the trough, as shown in Fig. 4 on to that part of the blank path which is shown in Fig. 5, the blanks will arrange themselves so as to be supported on their heads between the rails 65 and 66 and then travel downwardly by gravity along these rails. The open space between the rails allows dirt and other foreign matter, such as nails, wire, and chips, to fall out of the track.

As the blanks move down along the track to a position represented by the section shown in Fig. 7, they approach a blank selector 70 which is designed to discard any blanks which are not properly aligned. The engaging portion 70' of this selector extends out over the tracks 65 and 66 and has a sloping face arranged at an angle of about 45° to the path of travel of the blanks and is so spaced in relation to the top of the tracks that the head of a blank disposed in proper position will pass under the selector, but a blank which is not properly disposed or aligned in relation to the tracks will strike the selector and be pushed off through the gap 71 in track 65. In order to prevent properly aligned blanks from dropping through the opening 71, the tracks are tilted in a clockwise direction as viewed in the direction of the path of travel of the blanks and as shown in Fig. 7 so that as a properly aligned blank passes under the selector 70 and across the gap 71, it is sufficiently supported by track 66 alone, because the shank of the blank can rest against the inside wall of track 66. Discarded blanks will drop down into chute 72 (Fig. 8) from which they can be discharged into a suitable receptacle.

After the blank has passed the gap 71 in the track 65, it passes under a top rail 73 and continues to travel along the path indicated in Fig. 1 on the tracks 65 and 66, down to its destination which is illustrated as an assembly wheel shown at A. That portion of the track 65 and 66 which extends upwardly from the assembly wheel A for a short distance may be considered the blank reservoir.

I wish it to be understood that I do not limit myself to the exact details of construction shown and described, as my invention is obviously capable of various modifications.

I claim:

1. In a device of the character described, a track having inclined stationary spaced rails arranged to support the head of a bolt blank on the top of the rails with the shank of the blank extending between the spaced rails, a plane disposed at right angles to the plane of the upper surface of said track adapted to form an angle with a vertical plane so that one rail will be slightly higher than the other rail, a gap in the higher of the two rails adapted to permit the passage of a blank therethrough and a stationary arm arranged above said track and gap and spaced from the upper surface of said track a distance more than the thickness of the head of a bolt blank and adapted to engage a malformed or misplaced blank and force it through said gap to separate it from the remaining blanks traveling along said track while permitting a normally positioned and dimensioned blank to move past the gap supported on the unbroken rail with the head of the blank on top of the rail and the shank resting against the side thereof.

2. In a device of the character described a track having inclined stationary spaced rails arranged to support the head of a bolt blank on the top of the rails with the shank of the blank extending between the spaced rails, a plane disposed at right angles to the plane of the upper surface of said track adapted to form an angle with a vertical plane so that one rail will be slightly higher than the other rail, a gap in the higher of the two rails adapted to permit the passage of a blank therethrough and a stationary arm arranged above said track and gap and spaced from the upper surface thereof a distance more than the thickness of the head of a bolt blank and an inclined engaging surface on said arm arranged crosswise of the path of travel of said blank along said track at an angle less than a right angle to said path of travel and adapted to urge malformed or misplaced bolts off said track and through said gap while permitting a normally positioned and dimensioned blank to move past the gap supported on the unbroken rail with the head of the blank on top of the rail and the shank resting against the side thereof.

NORMAN V. KUEHLMAN.